Aug. 20, 1963   B. H. HALLSTRÖM   3,101,041
APPARATUS FOR HEAT TREATMENT OF LIQUIDS, SUCH
AS MILK, FRUIT JUICES AND THE LIKE
Filed March 11, 1960
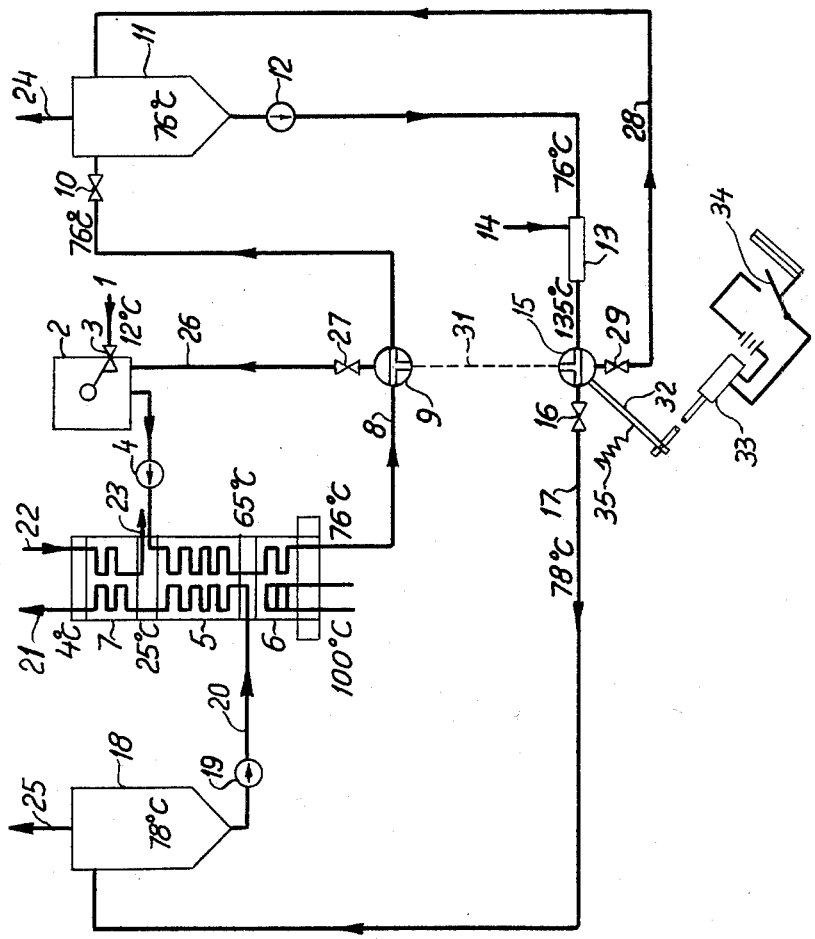
INVENTOR.
Bengt H. Hallström
BY
Davis, Hoxie, Faithfull &
Hapgood
Attorneys

United States Patent Office 3,101,041
Patented Aug. 20, 1963

3,101,041
APPARATUS FOR HEAT TREATMENT OF LIQUIDS, SUCH AS MILK, FRUIT JUICES AND THE LIKE
Bengt H. Hallström, Lund, Sweden, assignor to Aktiebolaget Separator, Stockholm, Sweden, a corporation of Sweden
Filed Mar. 11, 1960, Ser. No. 14,438
Claims priority, application Sweden Mar. 17, 1959
2 Claims. (Cl. 99—251)

This invention relates to the heat treatment of liquids, such as milk and fruit juices, and has particular reference to an improved apparatus for this purpose.

In the so-called "short time" pasteurization of milk as commonly practiced, the milk is heated to a temperature of about 125–160° C. Before the sterilization proper, the milk is pre-heated in a heat exchanger to about 76° C. and is de-aerated in passing through a closed tank which is kept at a vacuum corresponding to, or somewhat lower than, the pressure of the saturated steam at the temperature in question. The de-aeration is effected by means of a vacuum pump connected to the tank. The subsequent sterilization of the milk takes place within a temperature range where the milk is very susceptible to damage. This treatment must therefore be of very short duration. It may be effected by direct injection of live steam into the de-aerated milk by means of a steam injection nozzle. The temperature of the milk is thereby rapidly increased to the intended sterilization temperature (e.g. 135° C.), at which temperature the milk is maintained for a fixed, very short time interval. The milk is then passed through a throttle valve in which the pressure is decreased so that only part of the water in the milk is vaporized, with the consequence that the temperature of the milk is immediately reduced to a low value less dangerous for the flavor of the milk. The resulting liquid, consisting of milk and a foam of steam bubbles, is then led into a second closed tank which is under vacuum and in which the milk and the steam are separated, the steam being sucked away by means of a vacuum pump connected to an outlet in the upper part of the tank. By maintaining in this tank a suitable degree of vacuum (corresponding to a temperature of about 78° C.), the milk leaving the tank acquires the same composition and aqueous content as it had before the sterilization, as is usually desired, because in the tank as much steam is removed from the milk as was previously supplied to it in the steam injection nozzle or other admixing device. The sterile milk leaving the second tank is then cooled to the temperature desired.

The method just described for the sterilization of milk is generally satisfactory but has the weak point that, during operation, live steam of sufficient pressure must always be available for admixture with the milk. This is so because if the supply of steam decreases or ceases, the milk will be insufficiently heated and, therefore, not sterilized, with the result that the entire apparatus may become infected by non-sterilized milk, whereby the process must be interrupted and the apparatus sterilized before the pasteurization can be resumed. This procedure of course, is both troublesome and time-consuming. Attempts have been made to avoid this inconvenience by providing the apparatus with a return pipe through which the milk is returned from the steam injection device to the receiving vat in case of insufficient heating. However, owing to the admixture of steam, the returned milk has a much higher aqueous content than the incoming milk, for which reason the aqueous content of the treated milk discharged from the apparatus will rise to an unallowable degree. In this method, the foam from the overheated, boiling milk also creates certain difficulties. For exampe, it causes overflow in the open receiving vat.

The principal object of the present invention is to provide an apparatus of the character described which overcomes the above-noted difficulties.

In the apparatus of the present invention, the liquid to be treated is passed for de-aeration and deodorization through a tank provided with an evacuation outlet and in which at least approximately constant subatmospheric pressure is maintained, the liquid being pumped from this tank to a steam-admixing device for direct heating. According to the invention, the apparatus has a temperature responsive three-way valve located beyond the steam-admixing device, and a return pipe leads from this valve to the tank so that the liquid, in case of insufficient heating, is automatically led back to the tank. Variations in the steam pressure in the tank are thereby avoided, this pressure being kept constant by means of a vacuum pump. With this arrangement, temperature, aqueous content and output remain constant even though milk mixed with steam is returned from the steam-admixing device, because the steam supplied to the milk in the steam-admixing device is removed again from the returned milk in the tank and is discharged to the vacuum pump, whereby the aqueous content of the milk remains practically unchanged.

If the milk is led back to the closed tank through the return pipe in such an apparatus, interruptions will occur in the continuous process. In case of a long interruption, it is necessary to cut off the normal supply of milk to the closed tank. If this milk on its way to the tank passes through a pre-heating device, interruption of the milk flow may cause the milk to "burn on" to the heat surfaces in the pre-heating device, making it useless until it is cleaned. According to the invention, this risk is overcome by providing the apparatus with another three-way valve located in the pipe joining the pre-heating device and the closed tank, and also with a return pipe arranged between this valve and the receiving vat. This three-way valve may be separately temperature-controlled or may be operated by impulses from the three-way valve located beyond the steam-admixing device, both valves being arranged for simultaneous operation to return the milk to the receiving vat and to the closed tank, respectively, in response to under-heating of the milk by the steam-admixing device. The three-way valves are preferably arranged to operate for return of the liquid even upon failure of the electric power supply, and to remain set for return even when the electric power is restored. Such an apparatus is adapted to function immediately when the steam supply to the steam-admixing device is normal again. Even after a short period of interruption in the supply of electric current, the apparatus has been found to work satisfactorily when the operation is started again, since the three-way valves, if the heating is insufficient, remain set for returning the milk.

The invention is described more in detail below, reference being made to the accompanying drawing which schematically illustrates a preferred embodiment adapted for pasteurizing or sterilizing milk.

Referring to the apparatus as illustrated, milk at about 12° C. is delivered through an inlet pipe 1 to an open receiving vat 2 via a float-operated valve 3 which prevents overfilling of the vat. A pump 4 sucks the milk from the vat and carries it through a pipe to a regenerative section 5 of a heat exchanger, which also includes a heating section 6 and a cooling section 7 and which may be of the so-called plate type. In the regenerative section 5, the milk is heated to 65° C. and in the heating section 6 is further heated to 76° C. From there, the milk is led through a pipe 8, a three-way valve 9 and a throttle valve 10 to a closed tank 11, from the bottom of which the milk is delivered by means of a pump 12 to a steam-admixing device 13. The latter may consist of a mixing nozzle into which the steam is introduced through an inlet 14. By the admixture of steam, the temperature of the milk in the mixer 13 is increased to, say, 135° C. The milk then passes through another three-way valve 15 and a throttle valve 16, where the pressure is suddenly decreased so that the water in the milk is partly vaporized and the milk temperature drops to 78° C. The resulting mixture of milk and steam is led through a pipe 17 to a second closed tank 18 where the steam is separated from the milk. By means of a pump 19, the milk is drawn from the lower part of the tank 18 and passed through a pipe 20 to the regenerative section 5 of the heat exchanger, where this milk gives up part of its heat to the incoming milk and thereby is cooled to 25° C. In the cooling section 7 of the heat exchanger, the temperature of the milk is further lowered to 4° C., whereupon the treated milk discharges through an outlet 21. The supply of cooling medium to the cooling section 7 is through an inlet 22 and the discharge of the cooling medium is through an outlet 23. The tanks 11 and 18 are provided with top outlets 24 and 25, respectively, connected to a common vacuum pump or to separate vacuum pumps (not shown).

From the three-way valve 9, a return pipe 26 extends to the receiving vat 2. In this return pipe is a throttle valve 27. From the three-way valve 15, a return pipe 28 extends to the tank 11, and in this return pipe is a throttle valve 29.

The three-way valve 15 is a temperature-controlled so that if and when the milk is insufficiently heated in the steam-admixing device 13 (that is, is heated there only to a temperature lower than 135° C. in the chosen example), the three-way valve 15 is operated to divert the milk through the pipe 28 and thus back to the tank 11. The throttle valve 29 prevents steam formation in the pipeline before this valve and causes a sudden pressure drop corresponding to the pressure drop taking place in the valve 16, whereby the milk and steam returned to the tank 11 through the pipe 28 are separated from each other in tank 11. The steam thus entering tank 11, together with air and bad-smelling gases, are removed through the outlet 24. During normal operation, the tank 11 as well as the tank 18 are almost entirely empty of milk, so that only a small amount of milk is in their lower parts.

The three-way valve 9, like the three-way valve 15, is temperature-controlled so that in case of insufficient heating of the milk in the steam-admixing device 13, valve 9 is operated automatically to divert the milk from milk pipe 8 to the return pipe 26. Thus, a circuit is obtained comprising the receiving vat 2, the pump 4, the heat exchanger sections 5 and 6, the pipe 8, the three-way valve 9, the throttle valve 27 and the return pipe 26. By means of the throttle valve 27, an over-pressure upon the milk is obtained in the heating section 6, which prevents the milk from boiling and "burning on" the heating surfaces of this section. By means of the throttle valve 10, the pressure in the heating section 6 is maintained in a corresponding way during normal running, so that no steam formation occurs in this section, which otherwise might make it difficult to heat the milk in that section.

The discharge through outlet 25 from the tank 18 is mainly steam.

The throttle valves 10, 16, 27 anw 29 may be omitted if the passages in the three-way valves 9 and 15 are so dimensioned that the temperatures desired are attained. The pump 12 and the steam-admixing device 13 may consist of one or more series-connected steam injectors.

As illustrated, the two three-way valves 9 and 15 have an operative connection 31 between them, such as a servomotor, whereby movement of valve 15 to either position (in response to insufficient heating at 13 or to resumption of sufficient heating at 13, as previously mentioned) effects movement of the other valve to the corresponding position, that is, the position for return of the milk or the position for normal operation. Also, I have shown the valve 15 with an operating lever 32 connected to a solenoid 33, the energizing circuit of which includes a thermoresponsive switch 34 which is closed only when the temperature of the milk from the steam-admixing device 13 is at or above a certain value (say, 135° C.). At such times, the valve 15 is held in its normal operating position by solenoid 33, and at all other times this valve is held in its other or "return" position by a spring 35. Thus, the parts 32-35 form thermo-sensitive means for moving the valve 15 to its "return" position in response to decrease of the temperature of the milk from heating device 13, and for moving the valve to its normal operating position (as illustrated) when this temperature reaches a certain high value.

It is evident that the apparatus of the invention can also be used for heat treatment of other liquids than milk, e.g. fruit juices and the like. The apparatus is especially apt for use when the liquid to be heat treated is to be treated subsequently in an homogenization machine, since the latter, to work properly, requires a uniform and continuous supply of liquid. Such a supply of liquid is made possible by means of the apparatus of this invention.

I claim:

1. In an apparatus for heat treating a liquid, the combination of a closed tank for deaerating and deodorizing the liquid, a liquid supply pipe leading to the tank, a pre-heater through which the liquid is fed to said supply pipe, the tank having an evacuation outlet for maintaining subatmospheric pressure in the tank, a steam-admixing device, a pump for delivering liquid from the tank to said device for direct heating of the liquid, a pipe line leading from said device for conveying the heated liquid to further processing, a three-way valve in said pipe line, a return pipe connecting the valve to the tank, whereby said valve is operable in a first position to direct liquid through said pipe line from the steam-admixing device and in a second position to direct liquid from said device back to the tank, a pressure-reducing throttle device in the return flow path formed by said valve and return pipe and operable to effect a sudden reduction in the pressure on said liquid and thereby release steam therefrom, whereby said steam is removed through said evacuation outlet of the closed tank, a receiving vat for the liquid to be treated, said pre-heater forming a heated path through which the vat is connected to said liquid supply pipe leading to the tank, a second three-way valve located in said liquid supply pipe, and a return pipe leading from said second valve to the vat, whereby said second valve is operable in a first position to direct liquid from the pre-heater to the tank and in a second position to direct liquid from the pre-heater back to the vat, and an operative connection between said two valves whereby they are movable simultaneously from their first to their second positions.

2. Apparatus according to claim 1, comprising also a thermo-sensitive means for moving the valves to their second positions in response to decrease of the temperature of the liquid from said steam admixing device and for moving the valves to their first positions in response to increase of said temperature.

References Cited in the file of this patent

UNITED STATES PATENTS

| 1,863,786 | Feldmeier et al. | June 21, 1932 |
| 2,547,430 | Aldridge et al. | Apr. 3, 1951 |
| 2,846,320 | Wittwer | Aug. 5, 1958 |
| 3,010,832 | Dahlstedt | Nov. 28, 1961 |

FOREIGN PATENTS

| 112,277 | Australia | Jan. 16, 1941 |
| 417,029 | Great Britain | Sept. 26, 1934 |